United States Patent [19]

Wurst et al.

[11] Patent Number: 4,494,526

[45] Date of Patent: Jan. 22, 1985

[54] TEMPERATURE SENSING

[75] Inventors: William C. Wurst, Amherst; Donald W. Fyfe, Hollis, both of N.H.

[73] Assignee: Solar Decisions, Inc., Hollis, N.H.

[21] Appl. No.: 470,042

[22] Filed: Feb. 28, 1983

[51] Int. Cl.³ .............................................. F24J 3/02
[52] U.S. Cl. .................................. 126/419; 126/422; 126/437
[58] Field of Search ............... 126/422, 419, 425, 451, 126/437; 165/18

[56] References Cited

U.S. PATENT DOCUMENTS

| | | | |
|---|---|---|---|
| 3,998,207 | 11/1978 | Watt | 126/400 X |
| 4,125,107 | 11/1978 | Nurnberg | 126/437 X |
| 4,126,122 | 11/1978 | Bross | 126/437 X |
| 4,173,304 | 11/1979 | Johnson | 126/430 |
| 4,184,635 | 1/1980 | Bloomfield | 126/419 |
| 4,227,515 | 10/1980 | Jacob et al. | 126/427 |
| 4,339,930 | 7/1982 | Kirts | 126/419 |

Primary Examiner—Larry Jones

[57] ABSTRACT

A temperature differential measuring circuit includes first and second temperature sensitive transducers disposed in corresponding first and second legs of a bridge circuit. Disposed in third and fourth legs of the bridge circuits are fixed resistors. An operational amplifier has its input terminals connected to the output terminals of the bridge circuit with its output terminal connected to one of the fixed resistors so that that fixed resistor is in feedback relation between the input and output of the amplifier. The transfer function of this bridge circuit is less temperature dependent than the transfer functions of conventional voltage bridge circuits.

21 Claims, 5 Drawing Figures

TEMPERATURE SENSING

This invention relates to systems for controlling the collection and transfer of solar energy.

Typical solar collection controls in operation today initiate the pumping of a fluid through a solar collector by sensing the temperature difference that exists between the collector's absorber surface and the fluid to be pumped through the collector. One problem with such a system exists at start-up due to the supply ducts or pipes being relatively cold. Consequently, the initial flow creates a drastic drop in the absorber's temperature causing the system to erroneously turn off. Solutions to this problem being employed today include slowing down the initial fluid flow with a variable speed pump; increasing the drop-out temperature differential; providing a time delay at start-up to overide the drop-out temperature differential; and operating the collectors with a fixed reduced fluid flow rate. These solutions increase the cost and/or reduce the efficiency of the solar collection system.

In accordance with one aspect of the invention, there is provided a system for controlling the collection of solar energy that includes three transducers: a first transducer for sensing incident solar radiation, a second transducer for sensing ambient air temperature, and a third transducer for sensing stored fluid temperature. These sensed parameters are not impacted by the contrary effects of cold supply pipes and ducts on collection control. A first comparator responds to the outputs of the first and second transducers and provides a first control signal representing the effective difference between incident solar radiation and ambient air temperature; a second comparator responds to the outputs of the second and third transducers and provides a second control signal representing the effective difference in temperature between ambient air temperature and the fluid temperature; and a third comparator responsive to the first and second control signals provides an output signal (for turning a heat transfer fluid pump on, for example) when the control signals indicate available thermal energy.

A variety of transducer devices can be employed; for example, negative or positive temperature coefficient thermistors, semiconductor diodes or transistors, or integrated circuit transducers which yield a current or voltage proportional to the temperature of the device; and similarly, various comparators may be used, including data processing types of comparators implemented with a microprocessor, for example. In a particular embodiment, outside ambient air temperature is sensed by an NTC thermistor in a housing, the exterior surface of which has a high reflective, low absorptive and low emissive finish, such that radiational heat transfer is minimized. The temperature of the fluid is sensed by placing an NTC thermistor in intimate thermal contact with the fluid, for example water to be supplied to solar collector. In passive applications, this fluid is the indoor air.

Incident solar insolation is sensed by an NTC thermistor in a high absorptive assembly that is housed in an air-tight, transparent-glazed, reflective cavity. The size of the thermistor is small compared to the cavity, and the thermistor is disposed so that it is subjected to both direct and diffused solar radiation, in an arrangement that reduces external wind effects to a second order, and keeps the internal air temperature of the cavity close to the outside ambient air temperature. The temperature differential existing between this transducer and the ambient air temperature transducer is proportional to the incident solar radiation ('insolation') and causes the first comparator to generate a corresponding voltage.

The parasitic heat lost to the ambient by the collector is related to the temperature differential that exists between the collection fluid and the ambient air. A second voltage proportional to this temperature difference, and hence the parasitic loss, is generated by the second comparator. In applications where the fluid temperature does not fluctuate much, such as with swimming pool heaters and passive solar applications, this fluid temperature can be considered a constant and the fluid transducer can be replaced with a resistor of fixed value.

The available solar energy is proportional to the temperature difference between the radiation body and the ambient; and the heat lost by the collector when operating is proportional to the temperature difference between the collector storage fluid and the ambient. When multiplied by appropriate constants, which are determined by the design and construction of the collector, these temperature differences indicate incident energy and lost energy respectively. Comparing one to the other indicates whether there is a net energy gain or loss. To justify the use of the electrical energy to pump the fluid through the collector, the energy gain must exceed a reference level before the fluid is circulated through the collector.

The trigger level to start and stop pumps or fans for solar energy collection is ascertained by knowing the instantaneous collection characteristics of the collection system, and the minimum justifiable solar energy collection rate. These two factors resolve into a mathematical equation that interrelates incident solar radiation with parasitic heat loss to the ambient. The two differentials obtained by the three transducers are compared, so that when the minimum justifiable solar energy collection rate is exceeded, an output is generated which energizes a suitable control device, for example, a relay to start the respective pump or fan.

It is also desirable to provide the solar industry with a collection control that has multiple function capability such as outputs for monitoring incident solar radiation, the parasitic heat loss of the collector, the solar energy collected, and the collection efficiency. Additionally, such a control can be used in passive applications to indicate when the transmitted solar radiation exceeds the heat loss through a glazed surface. Appropriate steps may then be taken, either manually or automatically, to minimize the heat loss or maximize the solar heat gain by closing or opening shutters, drapes, shades, etc. Three outputs available from the control for monitoring purposes are:

a. an output proportional to the instantaneous incident solar radiation, b. an output proportional to the instantaneous parasitic heat lost by the collector to the ambient, and c. an output which indicates in binary fashion the state (either an excess or deficiency) of the solar energy collection rate. To obtain integrated outputs, a multi-channel strip chart recorder may be used to record the three above outputs (a, b, and c) as they vary with time. The total amount of incident solar energy is then described by the area on the chart bounded by the incident solar radiation signal (output a); the total amount of parasitic heat energy lost by the collector is described by the area on the chart bounded by the parasitic heat energy signal (output b) and the time intervals that the minimum solar energy collection rate is exceeded are indicated by output c. The net energy collected is the difference between the available incident solar energy during collection and the heat energy lost, and the collection efficiency is determined by the ratio of the net energy collected to the available incident solar energy.

In accordance with another feature of the invention, there is provided a temperature differential measuring circuit that includes first and second temperature sensitive transducers disposed in corresponding first and second legs of a bridge circuit. Disposed in third and fourth legs of the bridge circuits are fixed resistors. An operational amplifier has its input terminals connected to the output terminals of the bridge circuit with its output terminal connected to one of the fixed resistors so that that fixed resistor is in degenerative feedback relation between the input and output of the amplifier. The transfer function of this bridge circuit is less dependent on ambient temperature and exhibits a more linear response to temperature differentials than the transfer functions of conventional voltage bridge circuits. In a particular solar energy transfer control circuit, the two transducers are matched negative coefficient (NTC) thermistors, and the fixed and feedback resistors are of equal value. A constant of proportionality that relates the output of the amplifier to the temperature difference sensed by the two thermistors is the closed loop gain of the amplifier, which is a function of the ratio of the feedback resistance to its input resistance as provided by one of the thermistors. The closed loop gain increases with temperature as the thermistor resistance decreases due to the highly non-linear nature of the NTC thermistors. This increase in gain compensates for the decrease in bridge sensitivity at higher temperatures, and thus enables the bridge circuit to produce a voltage of improved linear proportionality to the sensed temperature difference over a wide range of temperatures despite the highly non-linear nature of the NTC thermistors.

Further features and advantages of the invention will be seen as the following description of a particular embodiment progresses, in conjunction with the drawing, in which.

DESCRIPTION OF PARTICULAR EMBODIMENT

Figure 1:
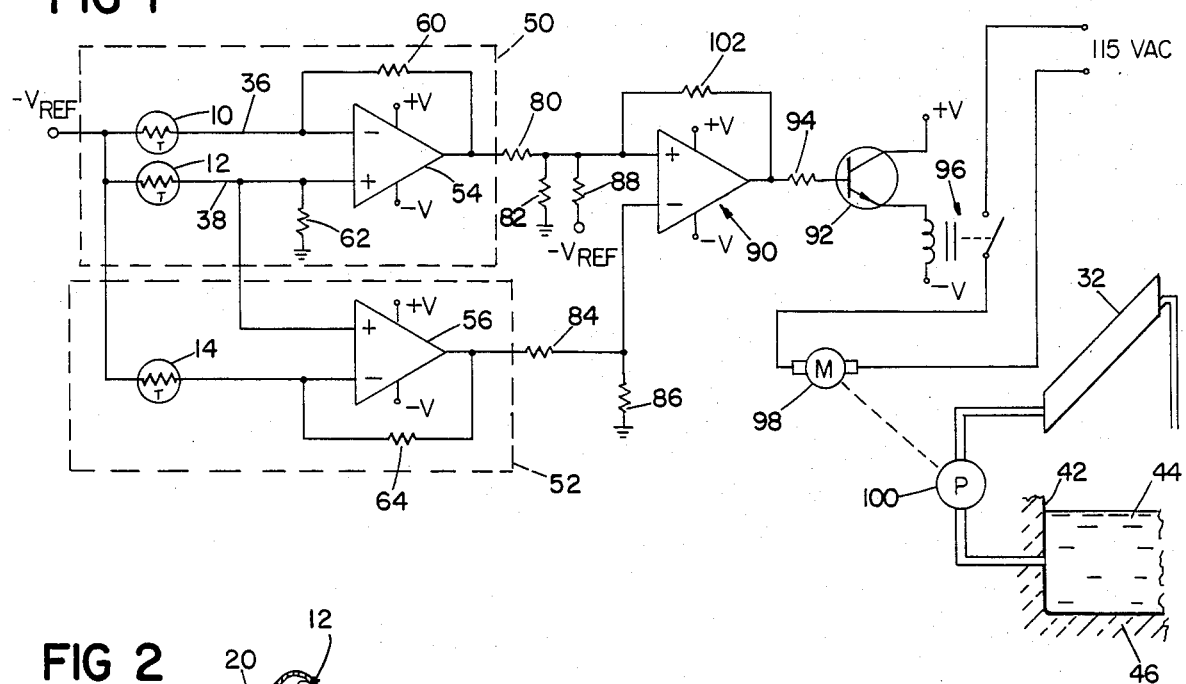
FIG. 1 is a schematic diagram of an energy control system in accordance with the invention.
Figure 2:
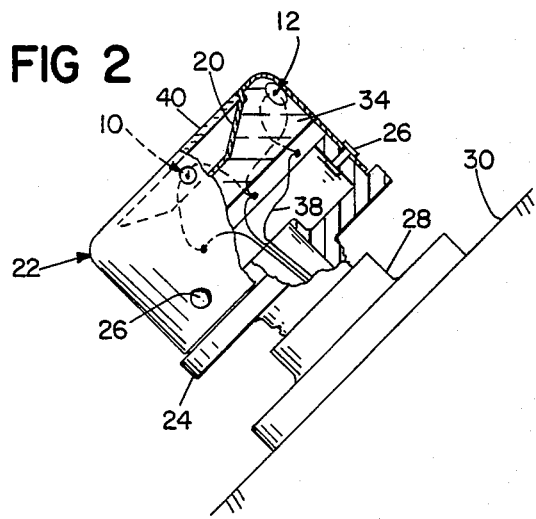
FIG. 2 is a view, partially in section, of a sensor assembly employed in the system of FIG. 1.
Figure 3:
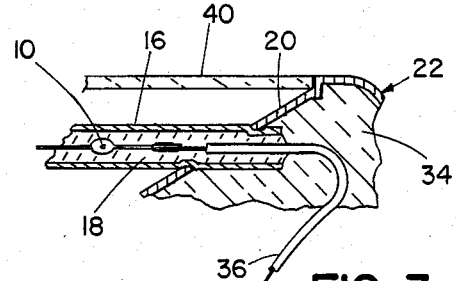
FIG. 3 is a sectional diagrammatic view of a portion of the sensor assembly shown in FIG. 2.

Shown in FIG. 1 is a solar energy collector control circuit that includes radiation sensor 10, ambient sensor 12, and fluid sensor 14, all three sensors being matched negative temperature coefficient (NTC) thermistors. The incident solar radiation sensor 10, as shown in FIGS. 2 and 3, is supported in a length of polypropylene tubing 16 that is filled with RTV silicone rubber potting material 18 such that the assembly has a black outer surface and is highly absorptive to solar radiation. Tube 16 is pressfitted in holes drilled in cavity portion 20 of sheet aluminum housing 22, the cylindrical body of which is secured to base 24 by fasteners 26. Base 24 is secured in socket 28 that is mounted on support 30 at a tilt angle and azimuth corresponding to that of solar collector 32 (FIG. 1). Thermistor 12 is epoxy bonded to the inner surface of housing 22, and foamed-in-place insulation 34 provides mechanical stability for the wires 36, 38 that are attached to thermistors 10, 12 respectively, and provides further thermal isolation of sensor 10. The top of cavity 20 is closed by a sheet 40 of transmissive glazing such as glass or a polymeric material (e.g., Filon or Kalwall). Hence, transducer 10 is in an environment that subjects transducer 10 to both direct and diffused solar radiation, reduces external wind effects to a second order, and keeps the internal air temperature of cavity 20 close to the ambient air temperature. The exterior surface of housing 22 (including cavity portion 20) has a high reflective, low absorptive and low emissive finish such that radiational heat transfer is minimized. The temperature of the heat transfer fluid (water) is sensed by potted thermistor 14 that is in intimate thermal contact with the fluid in storage tank 42 that holds the water 44 that is circulated to collector 32. Insulation 46 provides thermal isolation of tank 42.

With reference again to FIG. 1, the three sensors 10, 12, 14 are arranged in two modified bridge configurations 50, 52 with bridge 50 including insolation sensor 10, bridge 52 including water sensor 14, and the ambient sensor 12 being shared by both bridges. Bridge 50 also includes operational amplifier 54 while bridge 52 includes an identical operational amplifier 56. The three resistors 60, 62, 64 in the dual bridges are all of equal value, with resistor 62 being shared by both bridges.

Sensors 10, 12, 14 are highly non-linear devices and their resistances in fact vary exponentially with the reciprocal of the absolute temperature. A negative temperature coefficient (NTC) thermistor exhibits a very high electrical resistance at low temperatures that decreases rapidly with small increases in temperature. At high temperatures the thermistor has a very low resistance which decreases only slightly with increases in temperature. This would result in a decrease in bridge sensitivity at high temperatures if an ordinary voltage bridge configuration is used; however, the modified bridge 50, 52 operate so as to maintain substantially constant sensitivity over a wide range of operating temperatures and temperature differentials. Each modified bridge differs from an ordinary voltage bridge in that one end of a resistor in each bridge (resistor 60 in bridge 50 and resistor 64 in bridge 52) is connected to the output of its operational amplifier 54, 56 respectively, instead of to the same potential (ground) connection as its twin (the common resistor 62) in the adjacent leg of the bridge. Thus, the input terminals of operational amplifier 58 are connected to bridge terminals 66, 68. This connection to the output of the amplifier serves to provide negative feedback to the amplifier and thus stabilizes the bridge sensitivity. The transfer function of the modified bridge (as shown in FIG. 4) is:

$$\frac{V_o}{V_{REF}} = \frac{1}{1 + \frac{R(T_1)}{R}} \left( \frac{R(T_1) - R(T_2)}{R(T_2)} \right).$$

In further explanation, when the two thermistors 10 and 12 of bridge 50 are at the same temperature, they have equal resistance. Since the two fixed resistors, 60, 62 are also equal, a balanced condition is achieved and the output of the amplifier 54 drives to ground potential. As is well known, an operational amplifier using negative feedback will drive its output in such a manner as to maintain a voltage null across its two input terminals. Assuming negative bias voltage (as indicated in FIGS. 1 and 4), as the temperature of thermistor 10 increases relative to thermistor 12, the voltage at the negative input to amplifier 54 tends to decrease relative to the voltage at the positive input. The amplifier 54 increases its output voltage in order to maintain a voltage null at its input. Similarly, as the temperature of thermistor 12 increases relative to thermistor 10, the amplifier output increases so as to maintain a voltage null at its input. The output of the bridge 50 (amplifier 54) thus is proportional to the temperature difference of thermistors 10, 12. (A positive bias voltage, it should be noted, only inverts the polarity of the difference.) The constant of proportionality that relates the output of amplifier 54 to the temperature difference is the closed loop gain of the amplifier, which is a function of the ratio of feedback resistance to input resistance, or in the case of bridge 50, for example, the ratio of fixed resistor 60 to thermistor 60. The closed loop gain increases with temperature as the thermistor resistance decreases due to the highly non-linear nature of the NTC thermistors. This increase in gain compensates for the decrease in bridge sensitivity at higher temperatures.

Figure 4:
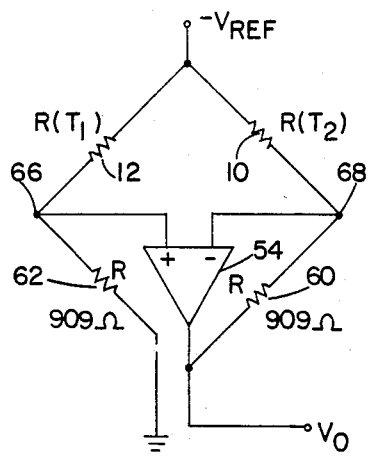
FIG. 4 is a schematic diagram of a bridge circuit employed in the system of FIG. 1.
Figure 5:
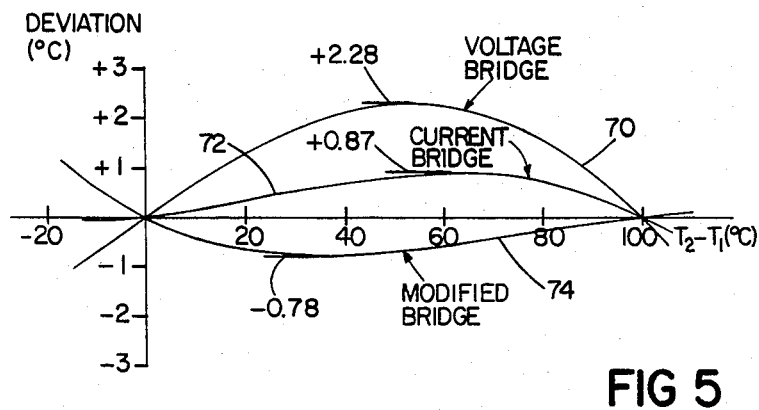
FIG. 5 is a graph comparing the operation of the bridge circuit of FIG. 4 with two other bridge circuits.

The graph of FIG. 5 compares the deviation from an ideal straight line response over a temperature range from 0° C. to 100° C. of a voltage bridge (the voltage between output terminals 66 and 68 is sensed)—curve 70, a current bridge (the current flow between the output terminals 66, 68 is sensed)—curve 72 and the bridge circuit of FIG. 4 (curve 74). An ideal differential temperature instrument would have a straight line response, the slope of which would be insensitive to changes in common mode variation (changes in ambient temperature). As indicated in FIG. 5, the magnitude of the maximum deviation from ideal of the circuit of FIG. 4 is about one third that of the voltage bridge (curve 70) and slightly less than the deviation of the current bridge (curve 72). While performances of the modified bridge of FIG. 4 and the current bridge are comparable, the modified bridge of FIG. 4 is useful for both instrumentation and control, whereas the current bridge is practical only for instrumentation applications.

Operational amplifier 54 senses the difference between the insolation temperature and the ambient temperature such that the voltage at its output is zero if there is no temperature difference, positive if the insolation temperature exceeds the ambient temperature (radiational heating) and negative if the insolation temperature falls below the ambient temperature (radiational cooling). In like manner, operational amplifier 56 of a similar bridge senses the difference between the water temperature and the ambient temperature such that the voltage at its output is zero if there is no temperature difference, positive if the water temperature exceeds the ambient temperature (parasitic heat loss) and negative if the water temperature falls below the ambient temperature (parasitic heat gain).

The output of operational amplifier 54 is thereby directly related to the incident solar power and the output of operational amplifier 56 is directly related to the parasitic heat lost by the fluid during collection. The output of operational amplifier 54 is attenuated by resistors 80, 82. In like manner, the output of operational amplifier 56 is attenuated by resistors 84, 86. In actual practice, only one output need be attenuated, and the requirement for one resistor, either 82 or 86, is eliminated. The amount of attenuation, if any, required at each output is determined by the physical parameters of the sensors 10, 12, 14 and collector 32. A voltage proportional to the minimum justifiable collection level is subtracted from the output of the first attenuator by a summing network formed by the first attenuator and resistor 88.

The values of the attenuators and the summing network can be varied from site to site as required by installing different resistors or, alternatively, by deleting resistor 82 and replacing resistor 88 with a variable resistor and adjusting the same. The fixed resistors comprising the attenuators can also be replaced with a potentiometer for each attenuator if further adjustability is required.

Voltage comparator 90 performs a comparison between the incident solar power level with the minimum justifiable collection level already subtracted from it (non-inverting input) and the parasitic heat lost in the collection process (inverting input). When the incident solar power level exceeds the sum of the parasitic heat loss and the minimum justifiable collection level, the output of comparator 90 goes from negative supply voltage to the positive supply voltage, turning on transistor 92 through base resistor 94. The transistor then activates relay 96 which in turn applies power to motor 98 which drives the pump 100 to circulate water from tank 42 through the collection system 32. Resistor 102 provides a small amount of positive feedback to comparator 90, producing modest hysterisis between the turn-on and turn-off point so that the system does not "chatter" when it is close to the trigger point.

While a particular embodiment of the invention has been shown and described, various modifications will be apparent to those skilled in the art, and therefore it is not intended that the invention be limited to the disclosed embodiment or to details thereof, and departures may be made therefrom within the spirit and scope of the invention.

What is claimed is:

1. In a system for transferring thermal energy as between a solar energy collector and a storage area,
   a first temperature sensitive transducer for sensing incident solar radiation and producing an output proportional thereto;
   a second temperature transducer for sensing the ambient temperature and producing an output proportional thereto;
   a third temperature sensitive transducer for sensing the temperature of energy transfer fluid in said storage area and producing an output proportional thereto;
   a first comparator which includes said first and second temperature sensing transducers and is adapted to provide a first control signal representing the effective incident solar radiation;
   a second comparator which includes said second and third temperature sensitive transducers and is adapted to provide a second control signal representing the effective parasitic heat loss; and
   a third comparator responsive to said first and to second control signals for producing an output only when said control signals indicate net available thermal energy.

2. The system of claim 1 wherein said first and second comparators are bridge circuits.

3. The system of claim 1 wherein said temperature sensitive transducers are thermistors.

4. The system of claim 3 wherein said first and second comparator circuits each include an operational amplifier and a feedback resistance connected to compensate for nonlinear response of said thermistors.

5. In a system for transferring thermal energy as between a solar energy collector and a storage area;
a first temperature sensitive transducer for sensing incident solar radiation and producing an output proportional thereto, said first transducer being mounted in a sealed cavity with an internal reflective surface and a radiation transmissive window for exposing said first transducer to both direct and diffused solar radiation corresponding to the manner in which the collector is exposed;
a second temperature transducer for sensing the ambient temperature and producing an output proportional thereto;
a third temperature sensitive transducer for sensing the temperature of energy transfer fluid in said storage area and producing an output proportional thereto;
a first comparator which includes said first and second temperature sensing transducers and is adapted to provide a first control signal representative of effective incident solar radiation;
a second comparator which includes said second and third temperature sensitive transducers and is adapted to provide a second control signal repre- sentive of effective parasitic heat loss; and
a third comparator responsive to said first and second control signals for producing an output when said control signals indicate net available thermal energy.

6. In a system for transferring thermal energy as between a solar energy collector and a storage area,
a first temperature sensitive transducer for sensing incident solar radiation and producing an output proportional thereto, said first transducer being an NTC thermistor in support structure that has high thermal absorptivity and that is housed in an airtight, transparent-glazed, thermally-reflective cavity, the size of said thermistor being small compared to the size of said cavity, and said cavity being disposed so that said thermistor is subjected to both direct and diffused solar radiation;
a second temperature transducer for sensing the ambient temperature and producing an output proportional thereto;
a third temperature sensitive transducer for sensing the temperature of energy transfer fluid in said storage area and producing an output proportional thereto;
a first comparator which includes said first and second temperature sensing transducers and is adapted to provide a first control signal representing the effective incident solar radiation;
a second comparator which includes said second and third temperature sensitive transducers and is adapted to provide a second control signal representing the effective parasitic heat loss; and
a third comparator responsive to said first and second control signals for producing an output when said control signals indicate net available thermal energy.

7. The system of claim 6 wherein said second transducer is an NTC thermistor disposed in a housing, the exterior surface of which has a high reflective, low absorptive and low emissive finish, such that radiational heat transfer is minimized, and said third transducer is an NTC thermistor disposed in intimate thermal contact with said fluid.

8. The system of claim 6 wherein said thermistor is potted in thermally absorptive material that is supported in said cavity, and said cavity is formed in a metal housing member to which said second transducer is secured, the exterior surface of said housing member having a high reflective, low absorptive and low emissive finish such that radiational heat transfer is minimized.

9. The system of claim 5 wherein said first and second comparators are bridge circuits, said first transducer being connected in one leg of a first bridge circuit, said third transducer being connected in one leg of the other bridge circuit, said second transducer being connected in a second leg of both bridge circuits, and each said bridge circuit includes an operational amplifier and a feedback resistance connected to compensate for nonlinear response of said thermistors.

10. The system of claim 9 wherein said transducers are matched negative coefficient (NTC) thermistors, and said fixed and feedback resistors in each bridge circuit are of equal value.

11. The system of claim 10 wherein the transfer function of each said bridge circuit is:

$$\frac{V_o}{V_{REF}} = \frac{1}{1 + \frac{R(T_1)}{R}} \left( \frac{R(T_1) - R(T_2)}{R(T_2)} \right).$$

12. A temperature differential measuring system comprising first and second temperature sensitive transducers disposed in corresponding first and second legs of a bridge circuit, a fixed resistor disposed in a third leg of said bridge circuit and an operational amplifier with a feedback resistor connected in negative feedback relation between the output and input of the amplifier disposed in the fourth leg of said bridge circuit.

13. The system of claim 12 wherein said two transducers are matched negative coefficient (NTC) thermistors, and said fixed and feedback resistors are of equal value, said bridge circuit producing an output voltage of improved linear proportionality to the temperature difference sensed by said thermistors over a wide range of temperatures despite the highly non-linear nature of said NTC thermistors.

14. The system of claim 12 wherein the transfer function of said bridge circuit is:

$$\frac{V_o}{V_{REF}} = \frac{1}{1 + \frac{R(T_1)}{R}} \left( \frac{R(T_1) - R(T_2)}{R(T_2)} \right).$$

15. A temperature differential measuring system comprising first and second temperature sensitive transducers disposed in corresponding first and second legs of a bridge circuit,
said first transducer being an NTC thermistor in support structure that has high thermal absorptivity and that is housed in a transparent-glazed, thermally-reflective cavity, the size of said thermistor being small compared to the size of said cavity, and said cavity being disposed so that said thermistor is subjected to both direct and diffused thermal radiation, a fixed resistor disposed in a third leg of said bridge circuit and an operational amplifier with a feedback resistor connected in negative feedback relation between the output and input of the amplifier disposed in the fourth leg of said bridge circuit.

16. The system of claim 15 wherein said thermistor is potted in thermally absorptive material that is supported in said cavity, and said cavity is formed in a metal housing member to which said second transducer is secured, the exterior surface of said housing member having a high reflective, low absorptive and low emissive finish such that radiational heat transfer is minimized.

17. The system of claim 15, wherein the transfer function of said bridge circuit is:

$$\frac{V_o}{V_{REF}} = \frac{1}{1 + \frac{R(T_1)}{R}} \left( \frac{R(T_1) - R(T_2)}{R(T_2)} \right)$$

18. The system of claim 17 wherein said second transducer is a negative coefficient (NTC) thermistor, and said bridge circuit produces an output voltage of improved linear proportionality to the temperature difference sensed by said thermistors over a wide range of temperatures despite the highly non-linear nature of said NTC thermistors.

19. The system of claim 18 for use in a system for controlling transfer of thermal energy between a solar energy collector and a storage area and further including a second bridge circuit;

said second bridge circuit include said second thermistor and a third NTC thermistor disposed in corresponding first and second legs of said second bridge circuit, a fixed resistor disposed in a third leg of said second bridge circuit and a second operational amplifier with a feedback resistor connected in regenerative feedback relation between the output and input of the amplifier disposed in the fourth leg of said second bridge circuit;

said first thermistor being arranged for sensing incident solar radiation and producing an output proportional thereto;

said second thermistor being arranged for sensing ambient temperature and producing an output proportional thereto;

said third thermistor being arranged for sensing the temperature of energy transfer fluid in said storage area and producing an output proportional thereto;

said first bridge circuit being adapted to provide a first control signal representing the effective incident solar radiation;

said second bridge circuit being adapted to provide a second control signal representing the effective parasitic heat loss; and a comparator responsive to said first and to second control signals for producing an output when said control signals indicate net available thermal energy; and means responsive to said comparator output for circulating said fluid to transfer thermal energy between said solar collector and said storage area.

20. A system for controlling transfer of thermal energy between a solar energy collector and a fluid storage area comprising a solar collector, a fluid storage area, fluid circulation means connected between said solar collector and said storage area, a first temperature sensitive transducer for sensing solar radiation incident on said collector and producing an output proportional thereto, a second temperature transducer for sensing ambient air temperature and producing an output proportional thereto, a third temperature sensitive transducer for sensing the temperature of energy transfer fluid in said storage area and producing an output proportional thereto, a first bridge circuit which includes said first and second temperature sensing transducers and is adapted to provide a first control signal representing the effective incident solar radiation, a second bridge circuit which includes said second and third temperature sensitive transducers and is adapted to provide a second control signal representing the effective parasitic heat loss, and a comparator responsive to said first and second control signals for producing an output when said control signals indicate net available thermal energy to transfer thermal energy by circulating said fluid between said solar collector and said storage area through said circulation means.

21. The system of claim 20 wherein each said transducer is a thermistor and each said bridge circuit includes thermistors disposed in corresponding first and second legs of the bridge circuit, a fixed resistor disposed in a third leg of the bridge circuit and an operational amplifier with a feedback resistor connected in regenerative feedback relation between the output and input of said amplifier disposed in the fourth leg of the bridge circuit.

* * * * *